United States Patent [19]

Sasabe et al.

[11] B 3,928,719

[45] Dec. 23, 1975

[54] IMAGE DISPLAY SYSTEM

[75] Inventors: Kaoru Sasabe, Ikeda; Hiroaki Kotera, Takatsuki; Toshihide Hane, Sakai; Nobuyoshi Kihara, Amagasaki, all of Japan

[73] Assignee: Matsushita Electric Industrial Co., Ltd., Osaka, Japan

[22] Filed: Mar. 23, 1973

[21] Appl. No.: 344,203

[44] Published under the Trial Voluntary Protest Program on January 28, 1975 as document no. B 344,203.

[30] Foreign Application Priority Data

| | | |
|---|---|---|
| Mar. 25, 1972 | Japan | 47-30197 |
| Mar. 25, 1972 | Japan | 47-30198 |
| Mar. 31, 1972 | Japan | 47-32925 |
| Mar. 31, 1972 | Japan | 47-32926 |
| Mar. 31, 1972 | Japan | 47-32927 |
| Apr. 13, 1972 | Japan | 47-37478 |

[52] U.S. Cl. ............ 178/6.8; 358/54; 178/DIG. 28; 358/6; 178/7.2

[51] Int. Cl.$^2$ ....................... H04N 5/36; H04N 5/68

[58] Field of Search ....... 178/DIG. 28, 5.2 D, 5.2 R, 178/5.4 R, 6.8, 7.2; 358/6, 54

[56] References Cited

UNITED STATES PATENTS

| | | | |
|---|---|---|---|
| 2,214,072 | 9/1940 | Biedermann | 178/6.8 |
| 2,297,461 | 9/1942 | Dillenburger | 178/DIG. 28 |
| 2,520,507 | 8/1950 | Marcy | 178/6.8 |
| 3,008,001 | 11/1961 | Reith | 178/DIG. 28 |
| 3,249,691 | 5/1966 | Bigelow | 178/DIG. 28 |
| 3,251,936 | 5/1966 | Berchtold | 178/DIG. 28 |
| 3,745,234 | 7/1973 | Szymber | 178/6.8 X |

FOREIGN PATENTS OR APPLICATIONS

| | | | |
|---|---|---|---|
| 842,788 | 7/1960 | United Kingdom | 178/DIG. 28 |

*Primary Examiner*—Robert L. Richardson
*Attorney, Agent, or Firm*—Stevens, Davis, Miller & Mosher

[57] ABSTRACT

A multi-purpose or universal image display system, in which information obtained by scanning an information carrier with an image scan/display device may be displayed on the same device and also on other display devices, and also the image information obtained by the afore-mentioned scanning and video signals from other video signal generators may be displayed either selectively or as multiple display on the afore-said scan/display device.

7 Claims, 14 Drawing Figures

IMAGE DISPLAY SYSTEM

This invention relates to a system, which is capable of flying-spot scanning a body or picture information carrier, and whose brightness is modulated according to a feedback signal derived through the scanning to obtain the display of information of the scanned body or picture information carrier on it.

In order for the invention to be fully understood, it will now be described reference to the accompanying drawings, in which.

Figure 2:
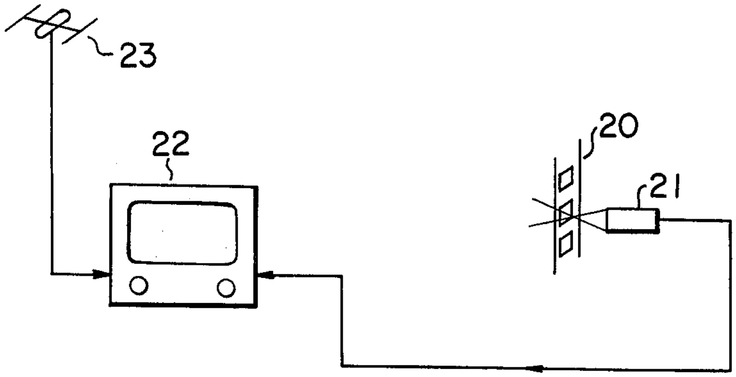
FIG. 2 is a schematic representation of the essential construction of the image display system according to the invention.
Figure 3A:
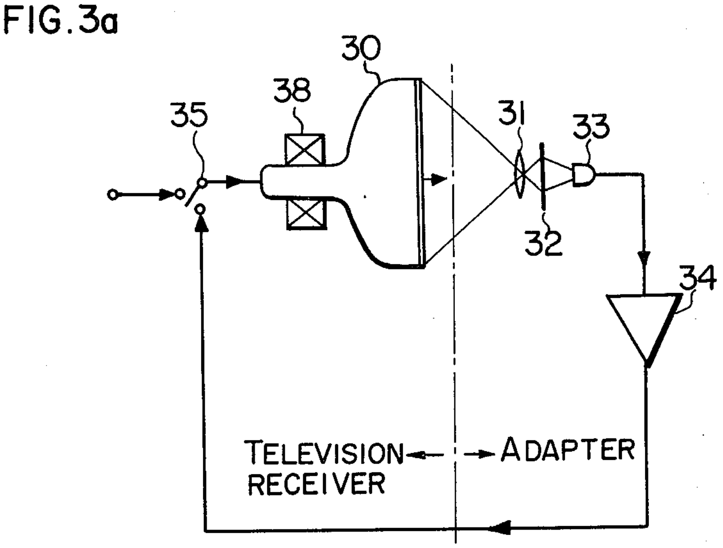
Figure 3B:
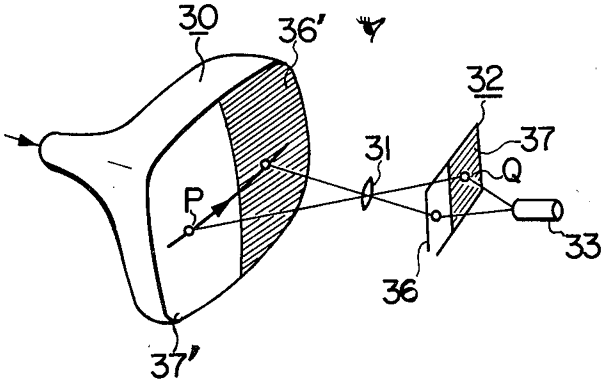
Figure 4:
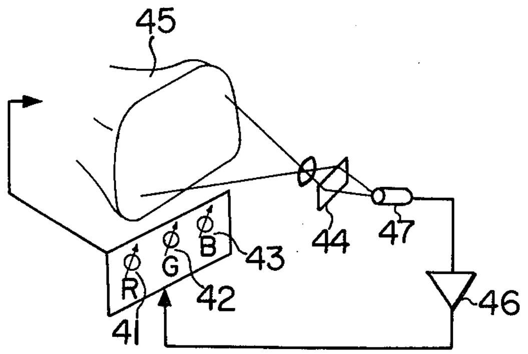
Figure 8:
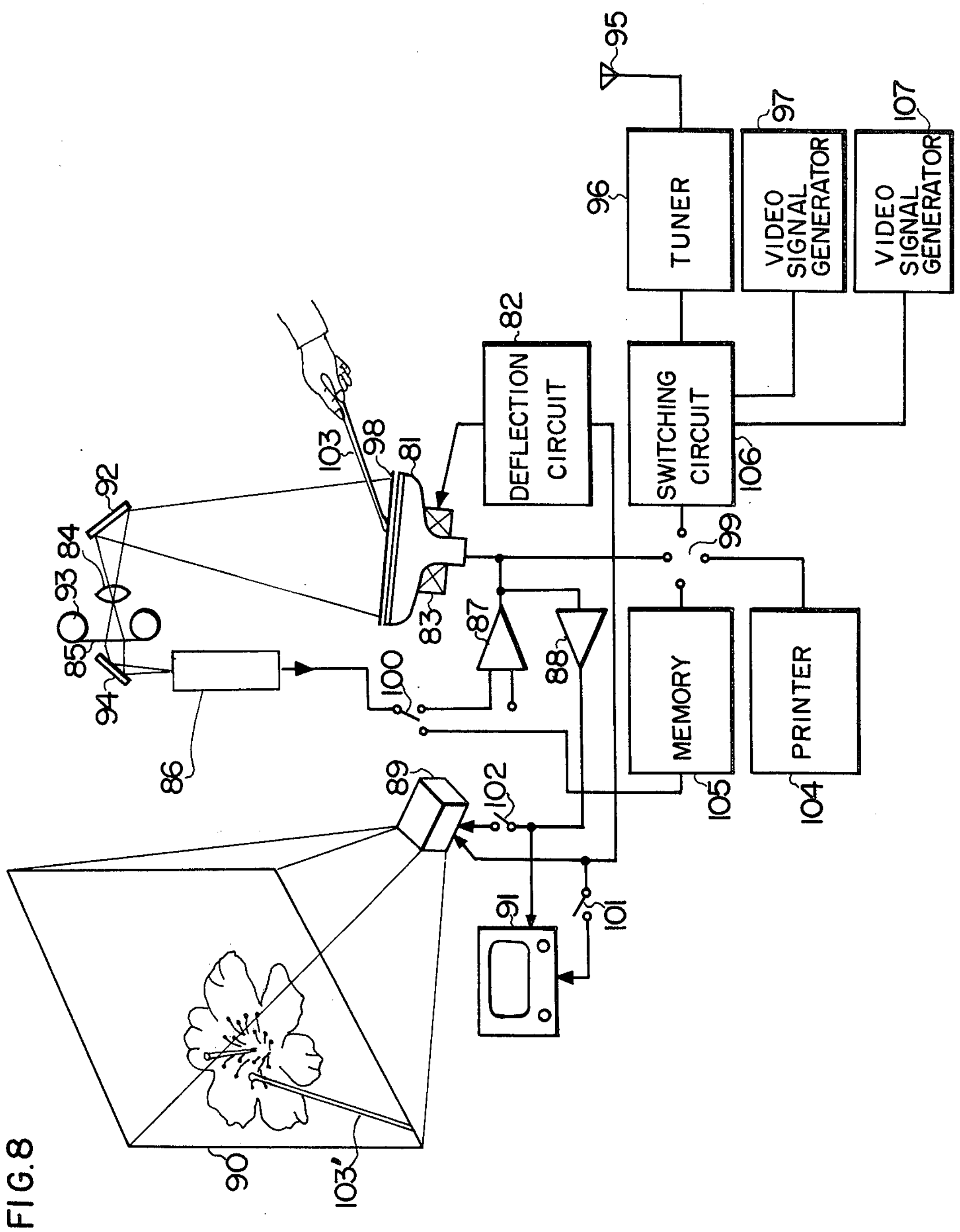
Figure 10:
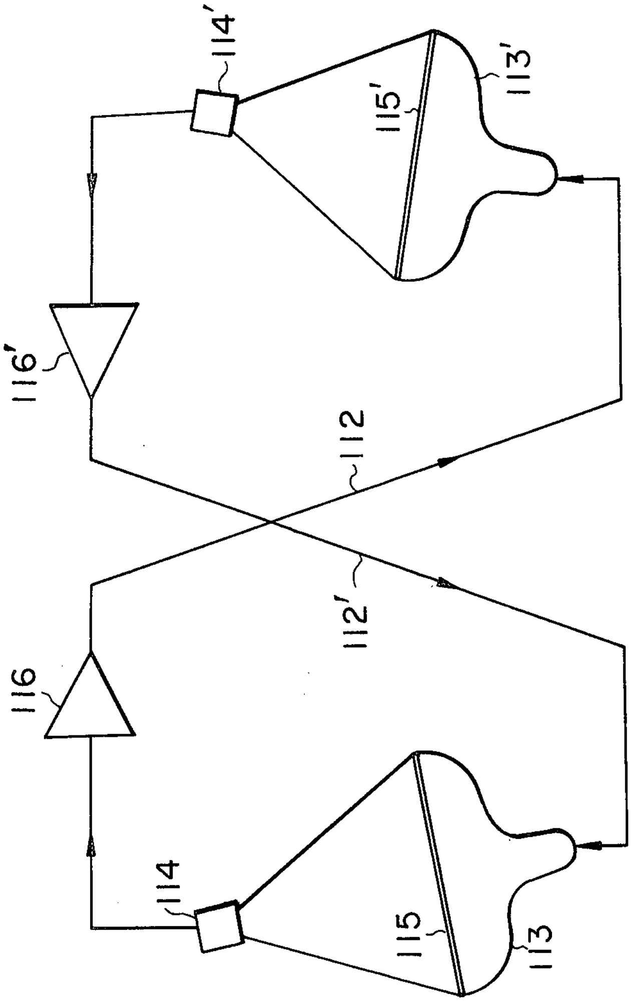
Figure 9:
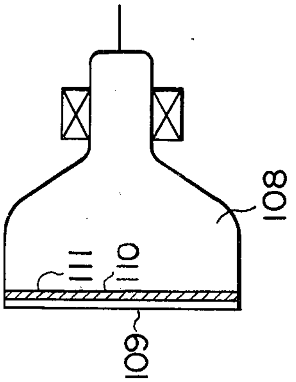
Figure 11:
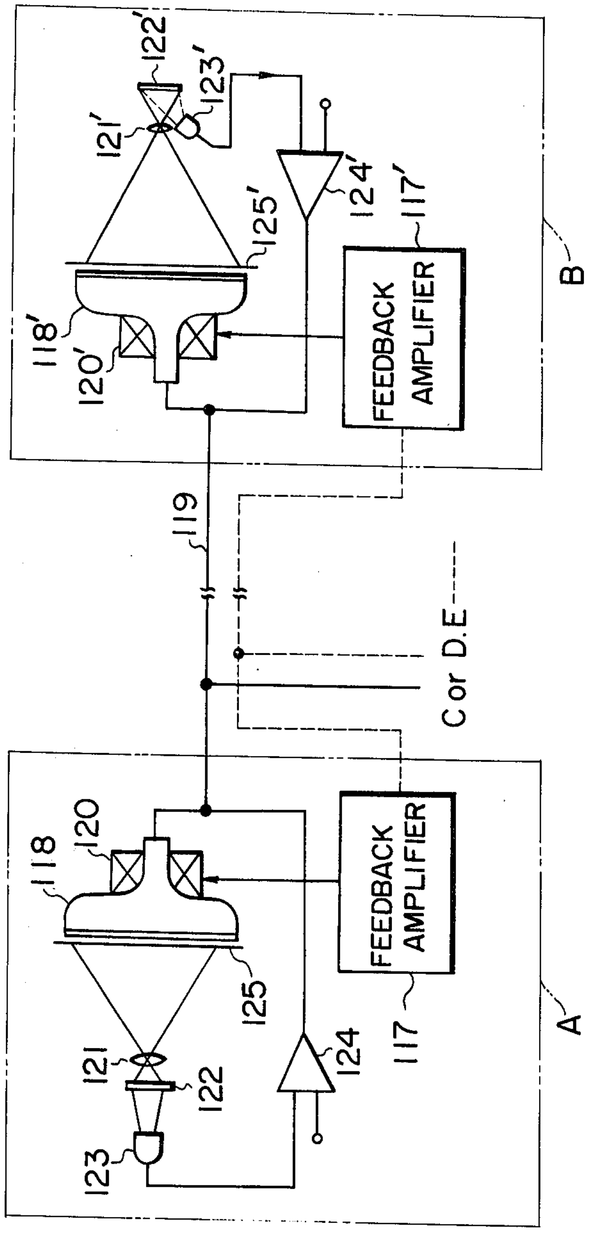
Figure 12:
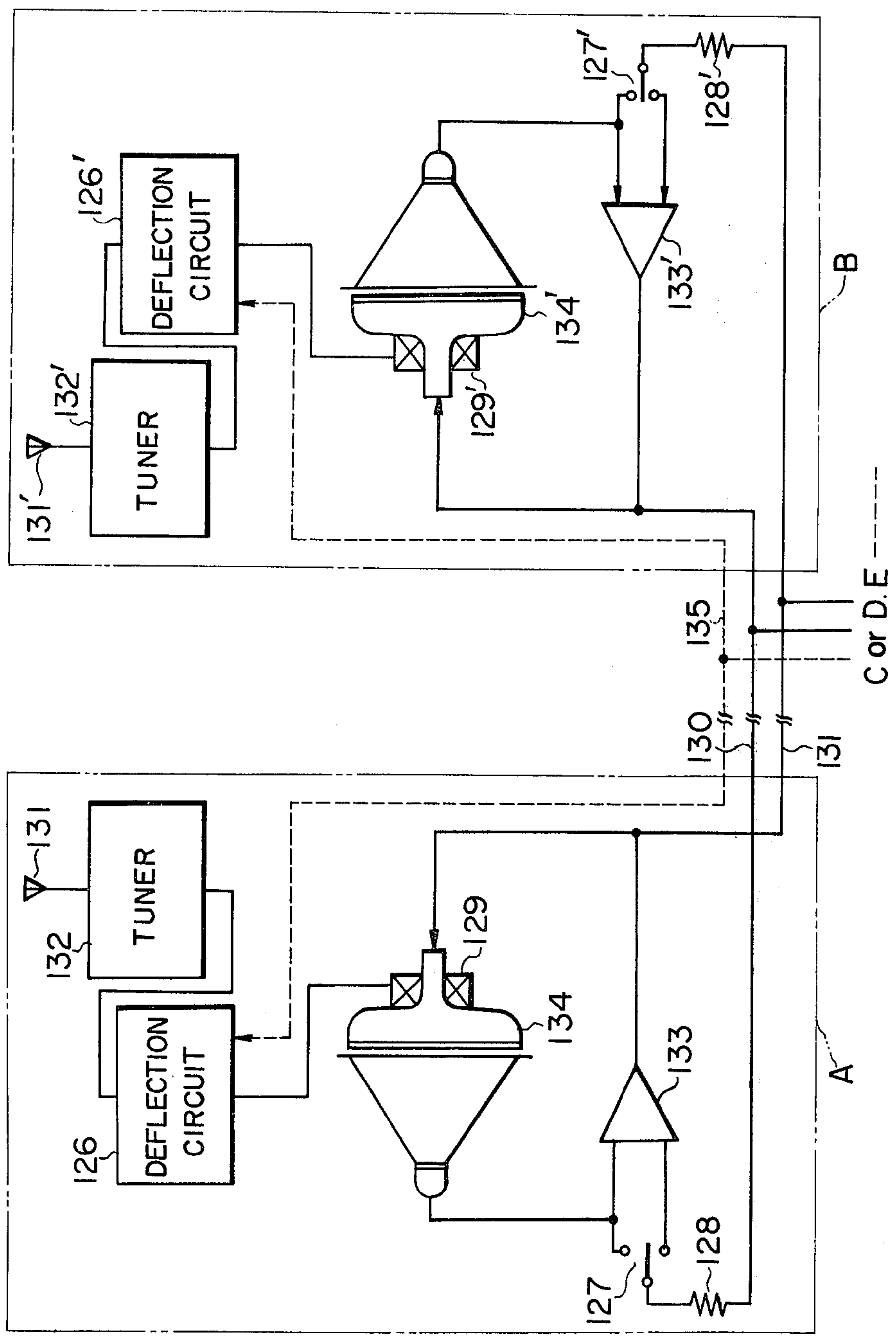

FIGS. 3*a* and 3*b* show operational principles underlying the invention;

FIG. 4 is a schematic representation of a construction suitable for realizing color display with the system of FIGS. 2 and 3;

FIGS. 5, 6, 7*a* and 7*b* are graphs showing characteristics of phosphor materials to be used for improving the performance of the system of FIG. 3;

FIG. 8 is a schematic representation of an embodiment of the image display system according to the invention;

FIG. 9 is a pictorial view showing part of a modification of the embodiment of FIG. 8;

FIG. 10 is a schematic representation of a picture intercommunication system embodying the invention; and FIGS. 11 and 12 are schematic representations of modifications of the embodiment of FIG. 10.

Figure 1:
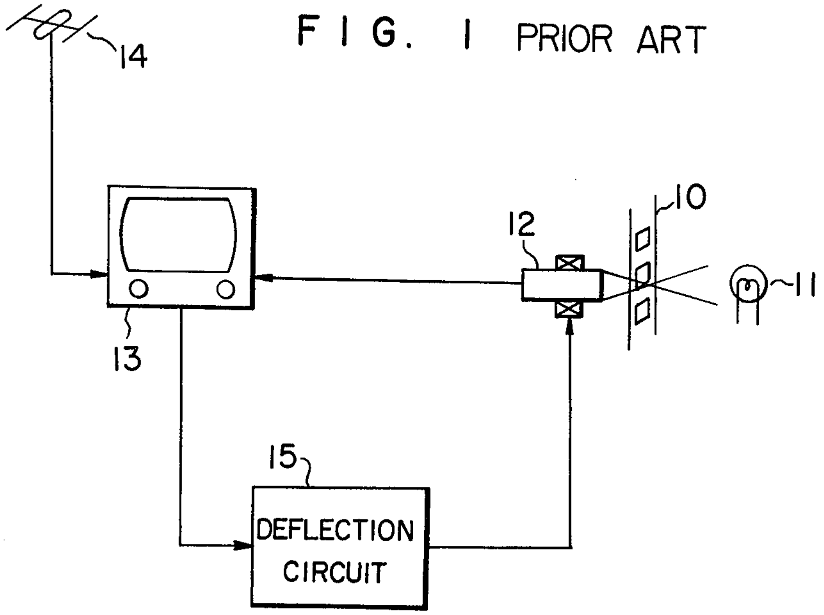
FIG. 1 PRIOR ART
FIG. 1 is a schematic representation of a prior-art example of the image display system.

In order for an image recorded on a film to be displayed on a television receiver, it has been usual to employ a set-up as shown in FIG. 1. In this set-up a film 10 is illuminated from a light source 11 disposed behind it and scanned by an image pick-up tube 12, whose output is coupled to a television receiver 13 for the display of the picked-up information on the receiver. The television receiver 13 here can also display a signal intercepted by an antenna 14. In the figure, reference numeral 15 designates a deflection circuit. This deflection circuit is of course required to drive the deflection yoke of the image pick-up tube 12. Also, the image pick-up tube itself is necessary for realizing the display of the film image on the television receiver. Further, the deflection circuit is required to ensure strict synchronization.

The present invention is predicated on the above aspects, and its object is to provide an improved image display system, which permits the display of information carried by such information carrier as an image film, for instance 8-mm or 16-mm picture film, and an apertured card without using any television camera or image pick-up tube.

According to the invention, there is obtained a multi-purpose or universal image display system, in which information obtained by scanning a film, apertured card or the like with an image scan/display device may be displayed on the same device and also on other display devices, and also in which the image information obtained by the afore-mentioned scanning and video signals from other video signal generators may be displayed either selectively or as multiple display on said scan/display device.

The novel techniques featured by the invention will now be described with reference to the accompanying drawings.

Referring now to FIG. 2, which shows the essential construction according to the invention, there is shown a film 20 having an image recorded thereon, which is flying-spot scanned from behind it and light transmitted through which is converted by a photoelectric transducer 21 into a corresponding electric signal for display on the receiver 22. The television receiver here can also display a signal intercepted by an antenna 23.

FIGS. 3*a* and 3*b* show the operational principles underlying the invention. Referring to these Figures, reference numeral 30 designates a scanner of a television receiver, which serves also as a display tube, and whose electron beam spot is focused via an optical system 31 on an image on a film 32. Light transmitted through the film is read out by a photoelectric multiplier 33 for each spot position. The multiplier 33 thus produces photoelectric current in accordance with the quantity of incident light or image density, which current is amplified by an amplifier 34, whose output may in turn be impressed upon a brightness control signal input terminal 35 of the unit 30. As is shown in FIG. 3*b*, which is a perspective view of an essential portion shown in FIG. 3*a*, the film 32 may have a high density portion 37 and a low density portion 36. Then, corresponding portions 37' and 36' will result on the scanner 30 via the optical system 31. Taking, for instance, point P on the scanner 30 corresponding to point Q on the film 32, light from this point P is modulated in intensity according to the image density at point Q before reaching the photoelectric multiplier 33. If the input to the scanner 30 is controlled by the amplifier 34 such that the output of the multiplier 33 is substantially constant, the brightness at point P varies according to the image density of the film at the corresponding point. The amplifier 34 is an inverter amplifier and it has such an amplifying function as to take an inverse of its input. This means that the level of the brightness at point P solely depends upon the density of the film 32 at the corresponding point thereon. In other words, the amplifier output corresponds to the inverse of the density. Thus, if a negative film is used as the film 32, a positive image spot is obtained at point P when the electron beam spot is deflected across the scanned face of the scanner 30 by the deflection yoke 38. When the spot on the film 32 leaves the high density portion 37 and comes to the low density portion 36, the transmitted light is not reduced in intensity so much because of low image density, so that the output of the amplifier 34 is lower than that due to light from the portion 37. Thus, the spot on the display tube 30 is brighter than it has been at point P. In this way, an image of inverse density pattern with respect to that of the film 32 will be obtained on the scanned face of the unit 30. While the above example uses the amplifier 34, it is also possible to use an exponential or logarithmic amplifier.

To obtain the color image display, a negative color film may be scanned by selectively or sequentially causing the glowing of different colors (for instance red, green and blue colors), for instance selecting respective color fields sequentially or line sequentially so that a color picture tube serving as a display tube may glow in a particular color at a particular instant. To this end, three photoelectric multipliers, for instance, respectively capable of selecting red, green and blue colors (for instance provided with respective optical filters at the front face) may be provided, and their outputs may be individually amplifier to produce respective brightness or saturation control inputs to the display tube. By so doing, not sequential but simultaneous tri-color negative display, that is, positive display of the negative color image, may be obtained.

FIG. 4 shows such a color image display system. In the Figure, most parts are those in the system shown in the preceding Figures, except for color balance adjustment knobs 41, 42 and 43. With this system, when a negative color film 44 is scanned by the flying spot of scanner 45 a corresponding color image is displayed on the scanner 45 by the action of an amplifier 46, with which the output of the associated one of three photoelectric multipliers provided with respective optical filters (only one photoelectric multiplier being typically shown for the sake of simplifying the drawing) is controlled to a substantially constant level. The amplitude or volume of the individual color signals may be adjusted through the respective adjustment knobs 41, 42 and 43, whereby a color image display most suited to the tube 45 may be obtained. Also, it is possible to insert a color correction circuit between the output side of the photoelectric multiplier and the saturation control input terminal. Generally, in case of adjusting the balance of a negative color picture takenby an amatuer in a deviated color tone through the aforementioned color correction circuit to obtain a color image display most suited to the tube, the deviation from the reference value of the color correction circuit represents the extent of correction of the color balance when obtaining a fixed positive picture from the negative color image.

While the above example is concerned with the negative display of the positive, the same principles apply in the case of positive display, which is obtained through positive feedback. Where positive feedback is employed, light after passing through a small film portion of an image density above a certain level is reduced in intensity, and the light of reduced intensity is further reduced in intensity after passing the same film portion once again. Thus, it will be seen that the intensity of light for this small film portion is eventually reduced to zero. On the other hand, at the instant of scanning a portion of the film which allows penetration beyond a certain level, the intensity of light scanning this portion is progressively increased since the initially high output of the photoelectric multiplier 33 is directly or positively fed back, so that the brightness eventually goes to saturation. In this way, an intermediate shade will be changed to either one of the opposite extremeties, that is, black or white, depending upon whether it is below or above a certain level. This tendency is disadvantageous for ordinal pictures, but it may be rather convenient for usual documents for it provides for clearer contrast. This mode of display however requires means for stabilizing the picture, that is, preventing external light from entering the photoelectric multiplier lest the whole display tube face should be saturated or brought to the maximum brightness state. To this end, the amplifier may be imparted with a function of cutting off the output signal of the photoelectric multiplier for a certain fixed time from the instant occurrence of saturation or intermittently chopping it at a predetermined interval. Alternatively, a level limiter having a certain high threshold level may be added. Also, a d-c input may be additionally fed to the photoelectric multiplier for maintaining a minimum intensity or brightness at which the scanner tube can continue the scanning in case when no light is incident on the photoelectric multiplier. Of course the intermediate borderline image density may be desirably shifted either toward black or white.

Figure 5:
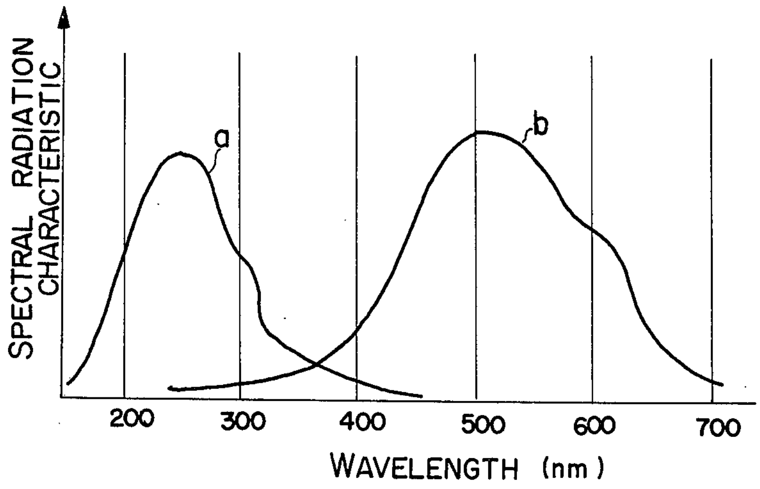
Figure 6:
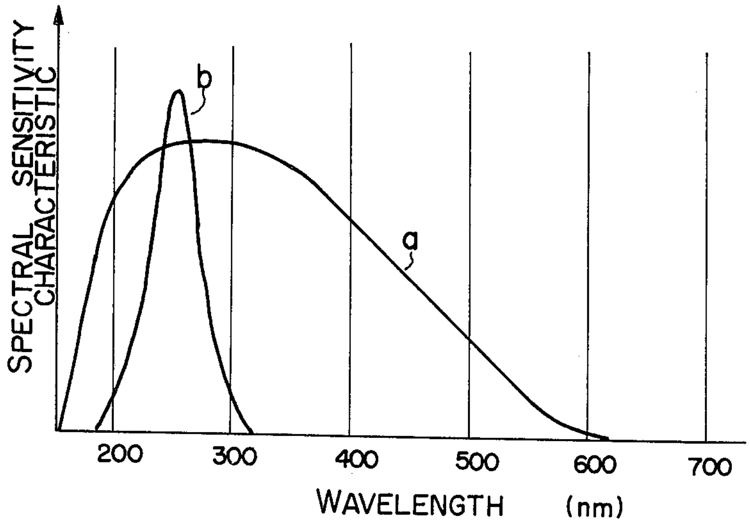
Figure 7A:
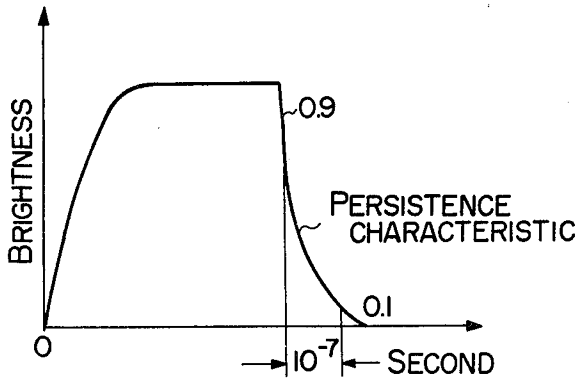
Figure 7B:
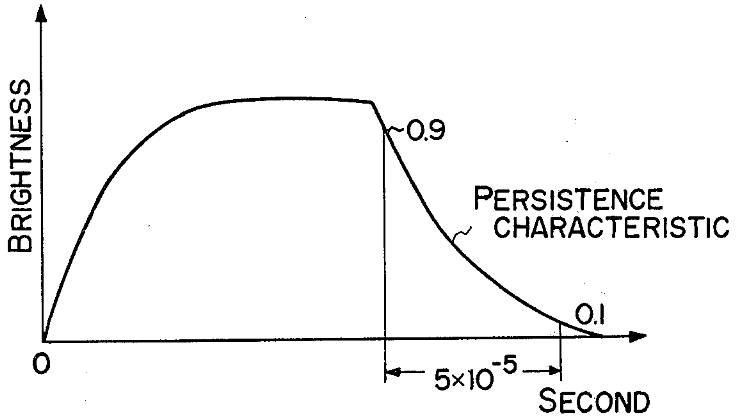

In all the above systems it is desirable to have the spot diameter as small as possible and the persistance time of the spot as short as possible from the standpoint of improving the resolution or clearness of the display. However, doing so is likely to increase flicker to an extent of giving discomfort to the eye in an extreme case. This problem can be effectively solved by coating with a phosphor material having long persistence and another phosphor material having short persistence, these materials being coated either in the form of a lamination or in the form of a mixture. This aspect will now be described in further detail with reference to FIGS. 5 to 7*b*. FIG. 5 shows two spectral radiation characteristics *a* and *b* of different phosphor materials. The material of characteristic *a* is capable of emitting radiant rays of wavelengths substantially in a range (ultraviolet range) adjacent the lower limit of the visible range, while the material of characteristic *b* is capable of emitting radiant rays of wavelengths substantially in the visible range. The former material has a short persistance characteristic, for instance $10^{-7}$ second as shown in FIG. 7*a*, while the latter material has a long persistence characteristic, for instance $5 \times 10^{-5}$ second as shown in FIG. 7*b*, longer than that of the FIG. 7*a* case by more than 100 times. If a light receiving element (such as photoelectric multiplier, phototransistor or photodiode) having a spectral sensitivity characteristic of curve *a* in FIG. 6 is used to detect the film image density from the transmitted light having the aforementioned spectral character for modulating the brightness according to a feedback signal derived from its output, substantially no flicker will be felt even if the light receiving element provides no appreciable persistance characteristic because the human eye is substantially insensitive to the characteristic *a* in FIG. 5. Meanwhile, the material of characteristic *b* in FIG. 5 has a long persistence characteristic and effectively excites the sense of sight, so that it is possible to obtain a display having a natural character like that of the ordinal television display. Also, if the light receiving element uses a filter having a limited spectral sensitivity as shown by curve *b* in FIG. 6, that is, capable of permitting only the light waves within the coverage of curve *a* in FIG. 5, it may be employed even in a considerably bright place.

As has been described, according to the invention it is possible to provide a system, which enables the display of film image information with only a single picture tube for the display without using any image pickup tube, and with which it is possible to overcome a shortcoming encountered when the light signal obtained by the modulating light from the display picture tube through an image information carrier is converted into a corresponding electric signal for the display of the scanned image information on the picture tube, namely the shortcoming that the signal detection for modulating the brightness of the picture tube at one point is adversely affected by the flying spot on the adjacent point to deteriorate the resolution if the persistence characteristic of the tube is too long while an intent to reduce the persistence characteristic for improving the resolution would result in increasing flickering character of the display on the tube, the flicker being suppressible without deteriorating the resolution of the display on the picture tube by coating it with two or more different phosphor materials different both in radiation wavelength coverage and in persistence time, the material having a long persistence characteristic being capable of providing only the wavelengths that can effectively excite the sense of sight while the material having the short persistence characteristic providing wavelengths within the coverage of a photoelectric converting element for detecting the display picture tube brightness control signal.

FIG. 8 shows an embodiment of the image display system constructed by incorporating the novel techniques featured by the invention. In FIG. 8, reference numeral 81 designates the afore-mentioned image scan/display device having the function as has been described earlier in connection with FIG. 3. Its deflection coils 83 are driven by a deflection circuit drive means 82. As it scans a picture film 85 carried by a film take-up means via a mirror 92 and an optical system 84, light transmitted through the film is led via a mirror 94 to a photoelectric transducer 86, whose signal output may be coupled through an inversion amplifier 87 to the device 81 to control the brightness thereof so as to obtain the display of the scanned image of the film 85 on the device 81. The image feedback signal from the inversion amplifier may also be coupled through an amplifier 88 to a projector 89 and also to a television receiver 91 for the display of the scanned image of the film 85 on a screen 90 and on the television receiver. The device 81 is also capable of the display of television signals intercepted by an antenna 95 and coupled to it through a tuner 96. In this case, the tuner output is coupled through a switching circuit 106. Further, the image feedback signal obtained through the scanning of the film 85 may be displayed in multiple display concurrently with the reproduction of a television signal. In this case, the image appearing on the device 81 is no longer a reproduction of the television signal with fidelity since the brightness is modulated according to both the television signal and the image of the film. However, circles, arrows and other simple marks may be inserted as multiple display without appreciably deteriorating the fidelity of reproduction of the television signal. Furthermore, it is possible for an object, for instance a baton 103 pointing to a part of the picture that is displayed on the scan/display device 81, to be also displayed in multiple display, for instance on the screen 90 as indicated at 103', on the television receiver 91 or on the scan/display device 81. Numerals 97 and 107 designate video signal generators such as an industrial television camera or video tape recorder, whose output can be handled in the ssme way as the broadcast television signal. Numeral 98 designates an image carrier made of a transparent material and bearing an image recorded on it. It may be superposed on the scan/display device 81 and scanned thereby in lieu of the film 85. Numeral 99 designates a switch for switching image signals, numeral 100 a switch for switching the image feedback signal, and numeral 101 and 102 switches for switching the image feedback signal to the projector 89 and the television receiver 91 respectively. Numeral 104 designates a printer for obtaining hard copies from image feedback signals obtained through the flying spot scanning with the scan/display device 81. Numeral 105 designates a memory for memorizing the image feedback signal obtained through the flying spot scanning of any given image of the film 85 with the device 81 and coupled through the switch 100. For the display of the memory content, it is coupled to the device 81 through a switch 99. The signal from the memory may be displayed concurrently with the display of the scanned image of the film 85 on the device 81. Also, the image due to the signal from the memory may be displayed in multiple display in superimposition upon the reproduction of the scanned image of the film 85 on the device 81. Further, a television signal intercepted by the antenna 95 and selected through the tuner 96 or a moving picture signal from, for instance, a video tape recorder may be coupled through the switching circuit 106 and switch 99 to the device 81 for multiple display thereon in superimposition upon the reproduction of a still picture signal derived from the film 85. As mentioned earlier, the video signal from the video signal generator 97 such as an industrial television camera or video tape recorder is handled in the same way as the video signal from the tuner 96.

It will be understood that with the system described above signals obtained by scanning image information carriers such as picture film or an actual scene with the image scan/display may be displayed on the device itself and also on a separate screen from a projector or on a separate television receiver. The system can thus find extensive applications. For example, it may be employed for teaching purposes with the projector or television receiver disposed in a schoolroom and the scan/display device used by the teacher. In this case, the teacher can let his baton pointing to a part of the picture be also displayed and freely correct the displayed picture or add symbols, characters or other drawings to the picture. Further, broadcast television signals can also be reproduced with or without a multiple display of the image of an indicator pointing to a part of the reproduced picture.

While the preceding embodiment is concerned with the scanning of a film, similar effects may also be obtained with an image information carrier such as a book from which image information can be derived in the form of reflected light.

Also, while the preceding system has employed a memory separately from the image scan/display device, the image scan/display device 81 may also serve the role of a memory if it is, for instance, a cathoderay chromic tube, i.e., an electron tube coated with a material capable of undergoing the phenomenon of cathode-ray chromism or coloring due to the energy of bombarding electrons of the electron beam.

FIG. 9 shows such an electron tube. In FIG. 9 it is indicated at 108, and it corresponds to the unit 81 shown in FIG. 8. Its face plate 109 is coated with a material capable of undergoing the phenomenon of cathode-ray chromism or coloring due to the electron beam energy, for instance sodalite, together with a phosphor material 110 which is usually coated on the face plate of the ordinary television receiver and another phosphor material 111 of short presistence (of the order of 0.5 microsecond), these materials being coated in the form of stripes or a lamination or as a mixture. In a case where the coating is in the form of stripes or a mixture, glowing of the phosphor materials is caused with low electron beam energy, while with high electron beam energy the afore-mentioned phenomenon of cathod-ray chromism results so that a record of a still image will be obtained. In the case where the coating is in the form of stripes, a record may be obtained by appropriately controlling the electron beam spot position. The record may be erased by directing external light to the coating. For example, in case of a sodalite coating a record will vanish after it is irradiated with external green light for 1 to 10 minutes, and then a new recording or writing can be done. As for the phosphor material, it is not always necessary to use one having long persistence and one having short persistence in combination, but it is possible to use only one of short persistence. Also, only with one having long persistence sufficient resolution may be obtained in the reproduction of a film image by so arranging as to repeat the scan cycle of the electron tube 108 for a long time or reduce the scan frequency that much.

It will be understood that the electron tube 108 can thus serve the role of a flying spot tube and the role of a display tube (indicator tube) and also have the function of recording or writing a still image and displaying the record. While the electron tube 108 can write a still image at a desired time, at any other time it can receive and display broadcast television information like the ordinary television received and also display an television image according to video signal from a video tape recorder or television camera. At the same time, it can also act as a flying spot tube and disassemble a film image with the flying spot on the phosphor materials 110 and 111.

As has been mentioned earlier, in the preceding system signals from a video tape recorder or the like or broadcast television signals can be coupled to the image feedback loop including the scan/display device 81. This image feedback loop may have a further function, namely a function of an intercommunication system, if it is interconnected with another similar image feedback loop including a similar scan/display device, and this aspect will now be described in connection with FIGS. 10 to 12.

FIG. 10 shows an example of such intercommunication system. In the Figure, reference numeral 113 designates a scan/display device. It is mounted on a desk or the like with the face directed upwardly, and a photoelectric transducer 114 is disposed above it. With this arrangement, an original 115 (which may be a transparent sheet bearing a script or the like in magic ink) overlaid over the scan-display device 113 can be scanned with the flying spot of the device 113, and the information of the original can be read out by the photoelectric transducer 114. Numeral 112 designates a communication line. Parts 112 to 116 belong to one station, while corresponding parts 112' to 116' belong to the other station. With this system, information read by the unit 114 and transmitted through amplifier 116 and communication line 112 to the other station may control the input control terminal of the scan/display device 113' for the display of the information of the original 115 on the device 113'. Also, on the other station side it is possible to correct or add to the information received and displayed on the device 113' in the light of the original 115', and the roles of both the stations can of course be interchanged. In this system, the transmitted image is positively displayed only on the transmitting side if the amplifiers 116 and 116' are inversion amplifiers, while positive display is obtained on both transmitting and receiving sides in the case of using non-inversion amplifiers. In either case, however, display of an intermediate image density or tone cannot be obtained as is apparent from the earlier explanation of the positive display system.

FIG. 11 shows another example of the intercommunication system. In the Figure, a scan/display device 118 belongs to a station labeled A and another scan/display device 118' belongs to another station labeled B. In station A, the flying spot in device 118 appropriately driven by deflection circuit 120 in any desired scan mode may scan through optical system 121 an image 122 or 125 to cause photoelectric transducer 123 to produce a corresponding electric signal, which is fed back through feedback amplifier 124 as brightness control input to the device 118. Similarly, in station B light transmitted through a hard copy or like original 125' or reflected from an object 122' such as a human face is converted by photoelectric transducer 123' into a corresponding electric signal for display on the device 118'. While on the scan/display devices 118 and 118' respective images of their own sides are displayed, similar patterns may also be displayed in superimposition upon the respective images of the other station sides if both the stations are interconnected with a transmission line 119. In this case, the sweep speed and mode of the deflection circuits 120 and 120' are desirably selected, but deflection drive circuits 117 and 117' are synchronized to each other. Also, a conference type picture communication network may be formed by connecting further stations (C, D, E and so forth) to the transmission line 119. In the system of FIG. 11, the transmitted image is displayed negatively both on the transmitting and receiving sides if the amplifiers 124 and 124' are inversion amplifiers, while it is displayed positively both on the transmitting and receiving sides if the amplifiers 124 and 124' are ordinal amplifiers. If only one of the amplifiers, namely amplifier 124, is an inversion amplifier, only the image transmitted from the side of that amplifier is displayed negatively on the transmitting and receiving sides. In this case, positive and negative images of course seem different from each other as has been mentioned earlier in connection with the example of FIG. 10.

FIG. 12 shows a further example of the intercommunication system, in which either positive or negative display can be selectively obtained, and which uses two transmission lines. In FIG. 12, numeral 127 designates a switch, which permits selection of either a positive or negative display of a received signal. Numeral 128 designates an adjuster for adjusting the balance of the received signal. Of the two transmission lines, one 130 is provided for transmission from station A to, for instance, station B, and the other one 131 for transmission from, for instance, station B to station A. Of course, the two transmission lines may be led to further stations C, D, E and so forth to extend the picture intercommunication network. The synchronization of each deflection drive circuit, for instance one 126, may be taken by driving it with a broadcast signal intercepted by antenna 131 and selected by tuner 132. Alternatively, a separate line 133 for exclusive use for synchronization may be provided. Numeral 129 designates deflection coils, and numeral 134 a scan/display device. Like reference numerals to those for the parts in station A but with a prime designate like parts in station B.

What is claimed is:

1. An image display system comprising a scan/display device capable of scanning with a flying spot, a picture information carrier scanned by the flying spot of said scan/display device, a photoelectric transducer for converting light modified by said picture information carrier into a corresponding electric signal, means, responsive to the electric signal produced from said photoelectric transducer, for amplifying said electric signal and feeding back positively an output signal corresponding to the amplified electric signal, said means for amplifying including a stabilizing device for limiting the output signal at a predetermined level, and means for leading the output signal produced from said amplifying means and video signals from video signal generators either simultaneously or selectively to said scan/display device.

2. An image display system according to claim 1, which includes means for coupling the output signal produced from said amplifying means and the video signals from said video signal generators simultaneously to said scan/display device for multiple display.

3. An image display system according to claim 1, which includes means for causing the display of the output signal produced from said amplifying means and video signals from said the video signal generators either simultaneously or selectively on said scan/display device.

4. An image display system according to claim 1, which includes means for leading the output signal produced from said amplifying means to other display means than said scan/display device including a television receiver and a projector.

5. An image display system according to claim 1, which includes means for leading the output signal produced from said amplifying means to a means for obtaining a hard copy of said output signal.

6. An image display system according to claim 1, which includes means for selectively leading the output signal produced from said amplifying means to a memory.

7. An image display system according to claim 1, wherein said scan/display device comprises a cathode-ray chromic tube.

* * * * *